US008585302B2

(12) United States Patent
Totani

(10) Patent No.: US 8,585,302 B2
(45) Date of Patent: Nov. 19, 2013

(54) CAMERA DEVICE WITH REDUCED SIZE

(75) Inventor: Tsutomu Totani, Aichi (JP)

(73) Assignee: Beat-Sonic Co., Ltd., Aichi (JP)

( * ) Notice: Subject to any disclaimer, the term of this patent is extended or adjusted under 35 U.S.C. 154(b) by 0 days.

(21) Appl. No.: 13/442,909

(22) Filed: Apr. 10, 2012

(65) Prior Publication Data

US 2012/0263450 A1    Oct. 18, 2012

(30) Foreign Application Priority Data

Apr. 18, 2011    (JP) .................................. 2011-091762

(51) Int. Cl.
*G03B 17/00*    (2006.01)
(52) U.S. Cl.
USPC .............................. 396/428; 396/424; 348/148
(58) Field of Classification Search
USPC .......... 396/419, 428, 424; 348/148, 144, 143; 248/187.1
See application file for complete search history.

(56) References Cited

U.S. PATENT DOCUMENTS 5,353,055 A * 10/1994 Hiramatsu .................... 348/145
5,897,223 A *  4/1999 Tritchew et al. ............... 396/13
7,090,178 B2 *  8/2006 Hughes et al. ............. 248/187.1
7,500,794 B1 *  3/2009 Clark ............................ 396/427
2004/0155959 A1 *  8/2004 Cullens ........................ 348/144
2009/0122141 A1 *  5/2009 Nakamura et al. ........... 348/148
2010/0283854 A1 * 11/2010 McKaughan et al. ........ 348/144
2012/0262541 A1 * 10/2012 Hollinger ....................... 348/36

FOREIGN PATENT DOCUMENTS

JP    2001-119687 A    4/2001
JP    A-2010-254078    11/2010

OTHER PUBLICATIONS

Office Action mailed on May 1, 2013 in corresponding JP application No. 2011-091762 (English Translation).

* cited by examiner

*Primary Examiner* — Clayton E Laballe
*Assistant Examiner* — Warren K Fenwick
(74) *Attorney, Agent, or Firm* — Posz Law Group, PLC

(57) ABSTRACT

A camera device includes a camera body including a camera housing which is formed into a substantially spherical shape, a bracket fixable to a vehicle, and a socket provided on the bracket into which a spherical portion of the camera housing is fittable. The camera body includes an imaging lens which is exposed from the socket. The spherical portion of the camera housing is fitted into the socket so that the imaging lens has an optical axis a direction of which is adjustable in a vertical direction and in a right-left direction relative to the socket.

5 Claims, 12 Drawing Sheets

CAMERA DEVICE WITH REDUCED SIZE

CROSS-REFERENCE TO RELATED APPLICATIONS

This application is based upon and claims the benefit of priority from Japanese Patent Application No. 2011-091762 filed Apr. 18, 2011 the entire contents of which are incorporated herein by reference.

BACKGROUND

1. Field

Embodiments described herein relate to a camera device, and more particularly to a camera device suitable to be mounted on vehicles by a customer/user installation manner.

2. Related Art

Japanese Patent Application Publication No. JP-A-2010-254078 discloses a vehicle-mounted customer/user installed camera device comprising a camera body, a holder, a ball joint and a bracket. The holder is fixed to an upper surface of the camera body, and the ball joint is accommodated in the holder. The bracket is mounted on the ball joint.

The bracket is fixed to a vehicle so that the camera device is mounted on the vehicle. The bracket is connected to the ball joint accommodated in the holder. Since the camera body is fixed to the holder, an installation angle of the camera body is adjustable in three or X, Y and Z directions perpendicular to one another.

The ball joint accommodated in the holder is used as an angle adjusting unit for the camera body in the above-described conventional camera device. The camera body is coupled via the ball joint with the bracket. Accordingly, an increase in the size of the camera device is unavoidable. This results in blocking driver's and passenger's views by the camera device as well as defiling vehicle interior.

SUMMARY

Therefore, an object of the disclosure is to provide a camera device which is smaller in size.

The disclosure provides a camera device comprising a camera body including a camera housing which is formed into a substantially spherical shape; a bracket fixable to a vehicle; a socket provided on the bracket into which a spherical portion of the camera housing is fittable, wherein the camera body includes an imaging lens which is exposed from the socket; the spherical portion of the camera housing is fitted into the socket so that the imaging lens has an optical axis a direction of which is adjustable in a vertical direction and in a right-left direction relative to the socket.

In the above-described construction, the camera housing is formed into the substantially spherical shape, and the spherical portion of the camera housing is fitted into the socket. Accordingly, the camera housing and the socket function as a ball joint. Consequently, since an optical axis angle of the imaging lens can optionally be adjusted without a ball joint being interposed between the camera body and the bracket, the camera device can be rendered smaller in size.

In one embodiment, the socket includes at least a pair of arms both of which have convexly curved surfaces respectively. The camera housing is held between the arms so as to be slidably in close contact with the convexly curved surface. The imaging lens is fitted between the arms so as to be exposed from between the arms.

Since the paired arms and the substantially spherical camera housing held between the arms function as a ball joint, the optical axis angle of the imaging lens exposed between the arms is optionally adjustable.

In another embodiment, the socket has a distal end surface and a proximal end surface both of which have respective openings, the socket further having an inner periphery formed with a convexly curved surface and an outer periphery formed with a plurality of vertical slits, whereby the socket is formed into a barrel shape. The bracket has an opening communicating with the proximal end opening of the socket. The camera housing is slidably in close contact with the convexly curved surface and fitted into the socket so that the imaging lens is exposed from the distal end opening or the proximal end opening of the socket.

According to the above-described construction, too, the barrel-shaped socket and the substantially spherical camera housing fitted into the socket function as a ball joint. Accordingly, the optical axis angle of the imaging lens exposed from the distal end opening or the proximal end surface of the socket is optionally adjustable.

In further another embodiment, the camera housing includes a portion thereof which is located opposite the imaging lens and to which a nut member is fixed. Since the nut member is fixed to the camera housing, the camera body fitted in the socket is rotated using a tool when the nut member is turned by a tool such as a spanner or wrench. This can render the optical axis angle adjustment of the imaging lens easier although the camera housing is formed into the substantially spherical shape.

In further another embodiment, the bracket has a bottom formed with an adhesive layer. Since the adhesive layer is formed on the bottom of the bracket, the camera body can be installed by adhering the bracket onto a front or rear window glass of the vehicle. This can improve the usability of the camera device.

DETAILED DESCRIPTION

Figure 1:
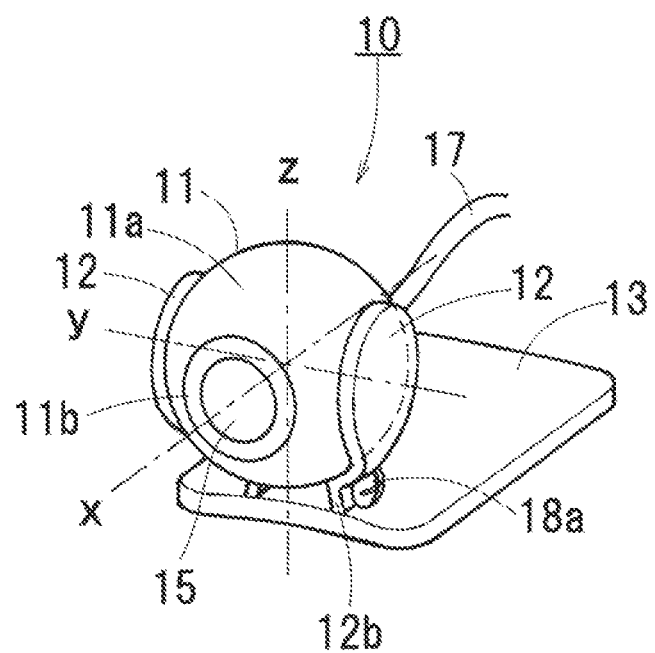
FIG. 1 is a perspective view of a camera device according to a first embodiment.
Figure 2:
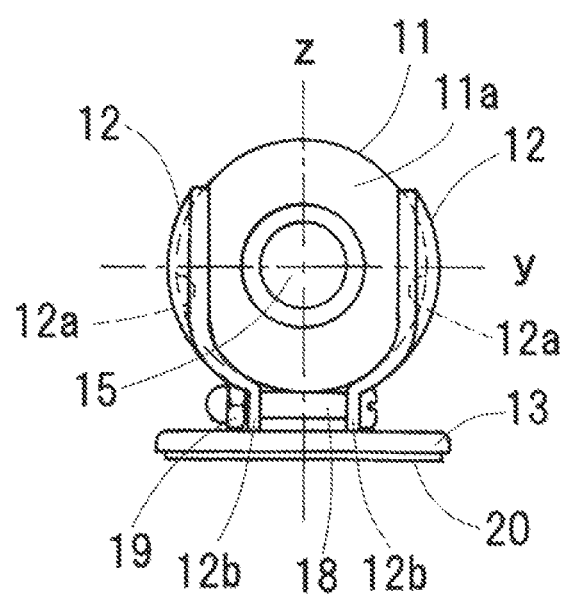
FIG. 2 is a front view of the camera device.
Figure 3:
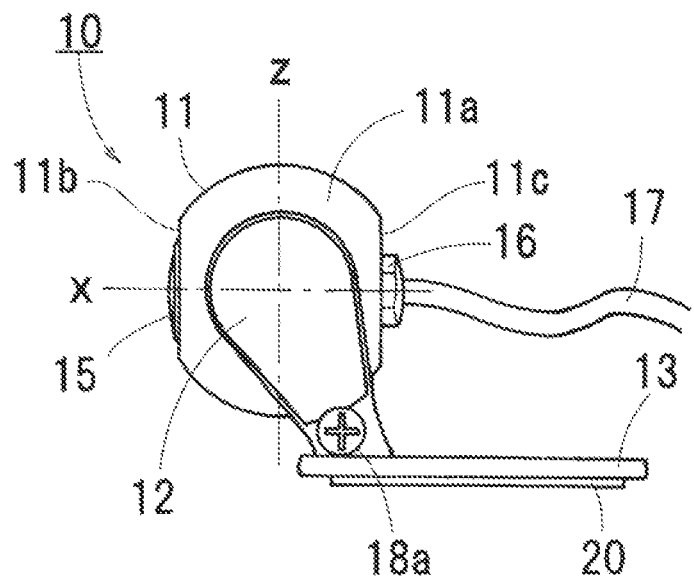
FIG. 3 is a cross-side view of the camera device.

Embodiments will be described with reference to the accompanying drawings. Referring to FIGS. 1 to 4, a camera device 10 according to a first embodiment is shown. The camera device 10 includes a camera body 11, a socket including a pair of right and left arms 12 and a bracket 13. The camera body 11 includes a substantially spherical camera housing 11a which has a flat front end surface 11b formed by cutting a part of a sphere and a flat rear end surface located opposite the front end surface and formed by cutting another part of the sphere. An imaging lens is exposed in the front end surface. A nut 16 is fixed to the rear end surface of the camera housing 11a. A cord 17 is drawn through the nut 16 outside the camera housing 11a. The camera body 11 is electrically connected via the cord 17 to a display device or a video device each of which displays a video image obtained by the camera body 11.

The arms 12 constituting the socket are fixed to the bracket 13 so as to be spaced from each other at opposite locations and so as to extend upward. Each arm 12 has an inner surface formed with a concavely curved surface 12a which has a predetermined curvature radius such that the surface 12a adheres closely to the spherical portion of the camera housing 11a. The arms 12 have proximal ends 12b formed with through holes respectively. A bolt 18 is inserted through both holes thereby to connect the proximal ends 12b of the arms 12. The bolt 18 has two ends, and a nut 19 is threadingly engaged with one end of the bolt 18 thereby to abut on the surface of the bracket 13. The other end of the bolt 18 is formed with a cross recess 18a. The bracket 13 has a bottom to which a double faced adhesive tape 20 is affixed.

The camera housing 11a of the camera body 11 has right and left spherical portions which are slidably in close contact with the concavely curved surface 12a. The imaging lens 15 is held between the arms 12 so as to be exposed between the arms 12, whereby the camera body 11 is mounted on the bracket 13. Since the socket comprising the substantially spherical camera housing 11a and the paired arms 12 functions as a ball joint, an optical axis (x axis) angle of the imaging lens 15 is adjustable with respect to an up-down direction (z axis) and a right-left direction relative to the bracket 13.

The bolt 18 is loosened in order that the camera body 11 may be fitted between the arms 12 thereby to be mounted on the bracket 13. After the camera body 11 has been fitted between the arms 12, the tool is inserted into the cross recess 18a to turn the bolt 18. However, since the nut 19 is in abutment on the bracket 13 thereby to be disallowed to turn, the bolt 18 is moved forward such that the arms 12 press the camera housing 11a. A fastening degree of the bolt 18 is adjusted thereby to adjust a contact pressure, whereby the arms 12 can apply a suitable fictional force to the camera body 11 when the camera body 11 is rotated for the purpose of adjusting an optical axis direction of the imaging lens 15. Accordingly, the optical axis angle is fixed by the frictional force when the rotation of the camera body 11 is stopped. Furthermore, in order that the camera body 11 may be rotated while being held between the arms 12, a tool is applied to the nut 16 fixed to the rear end surface of the camera housing 11a and then operated.

Figure 4:
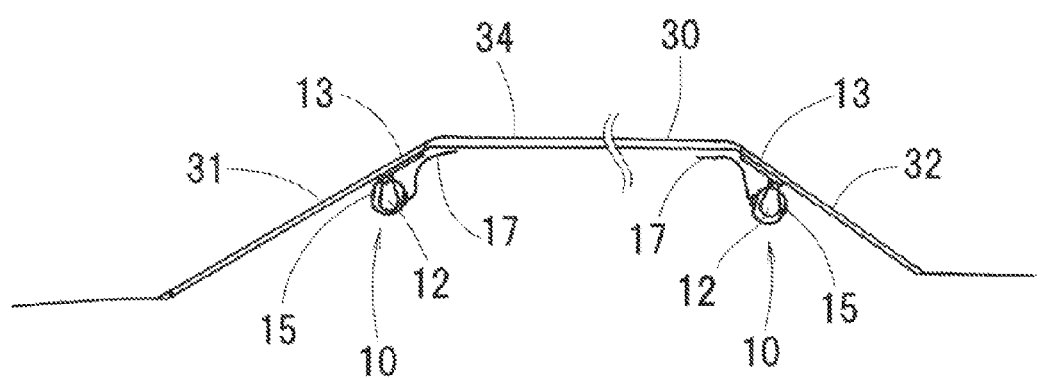
FIG. 4 is a schematic view showing a manner of installing the camera device onto the vehicle.
Figure 5:
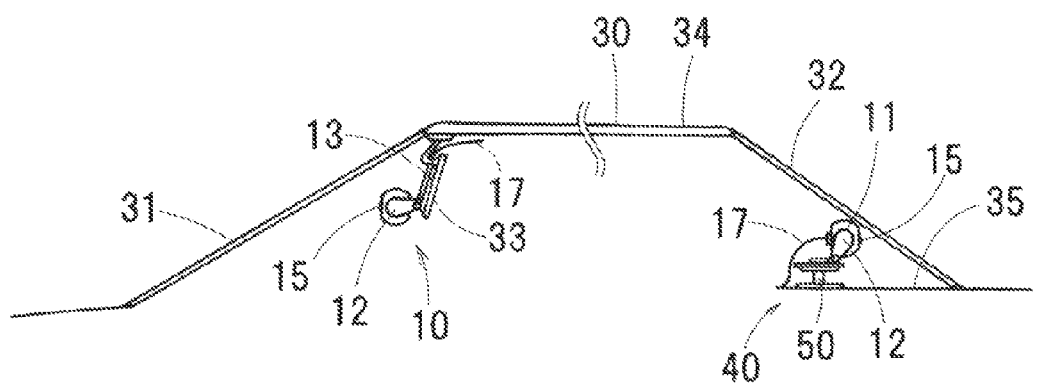
FIG. 5 is a schematic view showing another manner of installing the camera device onto the vehicle.

FIGS. 4 and 5 exemplify installation of the camera device 10 having the above-described structure on a vehicle 30. In example 1 shown in FIG. 4, the bracket 13 is directly adhered and fixed to an upper inner surface of a front window glass 31 of the vehicle 30 by the double faced adhesive tape 20 so that a forward field of view is imaged. In example 2 shown in FIG. 4, the bracket 13 is adhered and fixed to an upper inner surface of a rear window glass 32 so that a rear view is imaged. In example 2 shown in FIG. 5, the bracket 13 is directly adhered and fixed to a back surface of a rearview mirror so that a forward field of view from the vehicle 30 is imaged as in example 1. Although the camera device 10 is installed in a compartment of the vehicle 30 in the embodiment, an installation location of the camera device 10 should not be limited to the vehicle compartment interior. The camera device 10 may be installed on an exterior of the vehicle 30 such as an outer surface of the roof panel 34 or may be mounted on a wall or window glass of a residential building.

Figure 6:
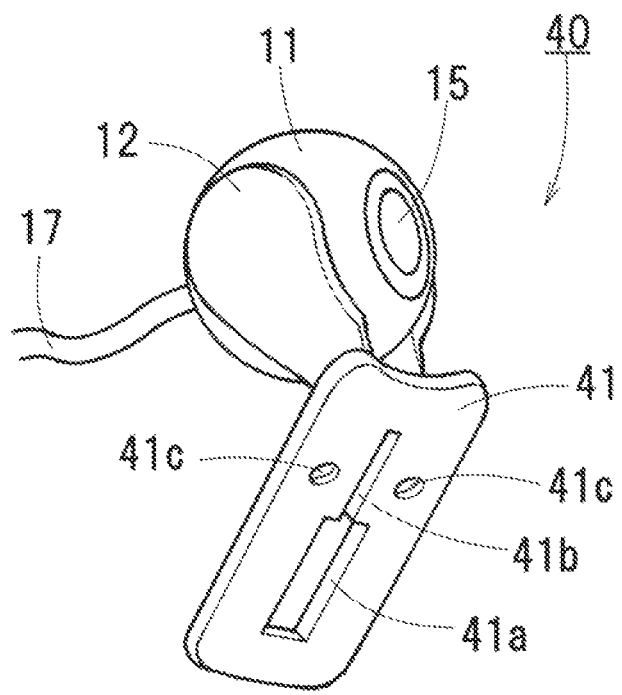
FIG. 6 is a perspective view of a camera device according to a second embodiment.
Figure 7:
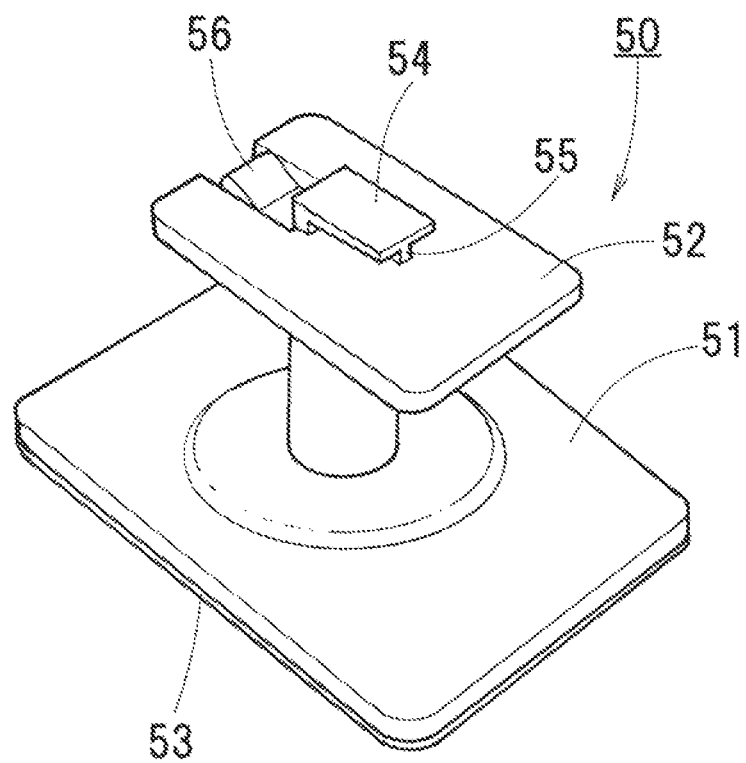
FIG. 7 is a perspective view of base bracket used to install the camera device.

FIGS. 6 and 7 illustrate a second embodiment. The camera device 40 according to the second embodiment includes a bracket 41 formed with a first rectangular wide engagement hole 41a, a second rectangular narrow engagement hole 41b communicating with the first engagement hole 41a, and a through hole 41c. The other construction of the camera device 40 is the same as that in the camera device 10 of the first embodiment. Accordingly, identical or similar parts in the second embodiment are labeled by the same reference symbols as those in the first embodiment, and the description of these parts will be eliminated.

The camera device 40 is mounted via a base bracket 50 as shown in FIG. 7 on the vehicle. The base bracket 50 includes a base plate 51 and a hook plate 52 standing on the base plate 51. The double faced adhesive tape 53 is affixed to the back side of the base plate 51. The hook plate 52 has a first hook strip 54, a second hook strip 55 and a press strip 56 all formed integrally therewith. When the first hook strip 54 is engaged with the wide engagement hole 41a of the bracket 41 and the bracket 41 is slid along the first engagement hole 41a, the second hook strip 55 is engaged with the second engagement hole 41b such that the press strip 56 presses the bracket 41, whereupon the base bracket 50 and the bracket 41 are detachably connected to each other.

FIG. 5 exemplifies installation of the camera device 40. The base plate 51 of the base bracket 50 is fixed to a rear board 35 of the vehicle 30 by the double faced adhesive tape 53 so that the bracket 41 is connected to the base bracket 50. The camera device 40 is thus installed thereby to image the rearward view from the vehicle. The bracket 41 may directly be fixed to the rear board 35 by inserting a small screw through the hole 41c of the bracket 41 without use of the base bracket 50.

Figure 8:
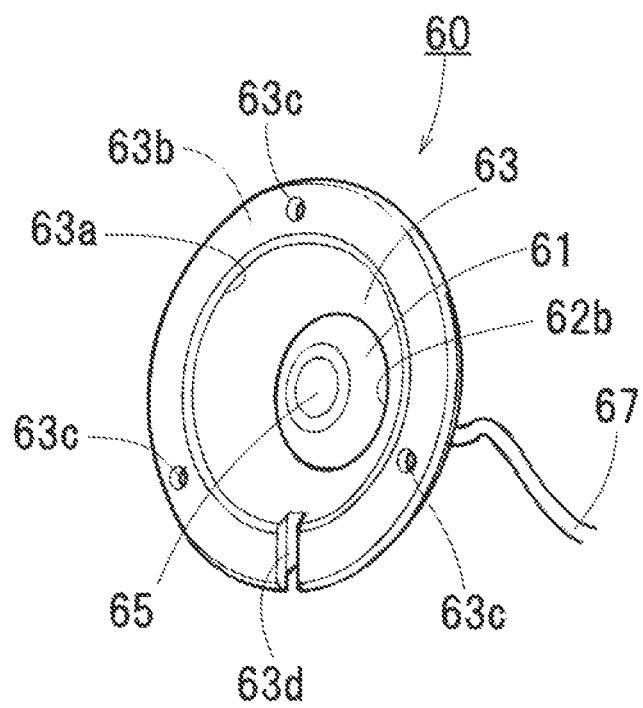
FIG. 8 is a perspective view of a camera device according to a third embodiment.
Figure 9:
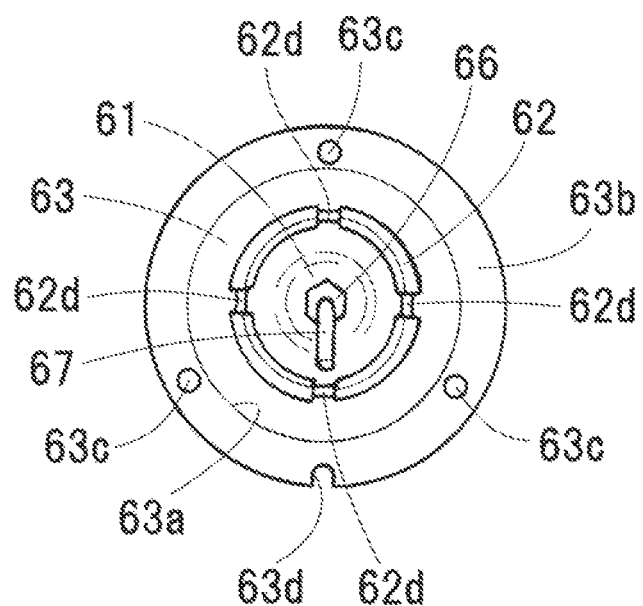
FIG. 9 is a rear view of the camera device.
Figure 10:
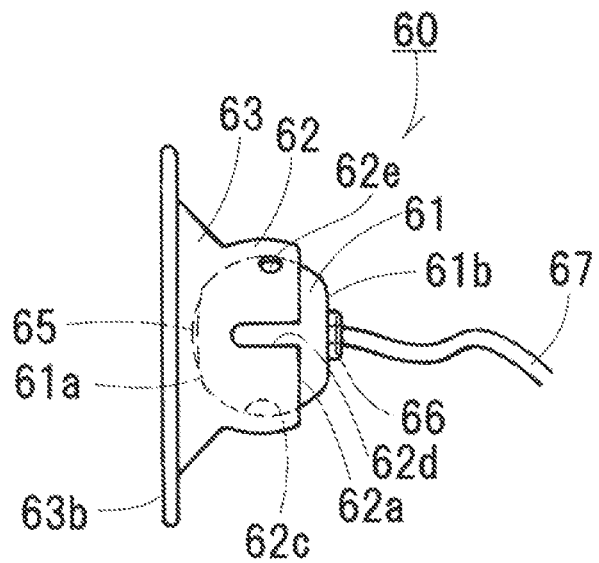
FIG. 10 is a cross-side view of the camera device.

FIGS. 8 to 10 illustrate the camera device 60 according to a third embodiment. The camera device 60 includes the camera body 61, the socket 62 and the bracket 63 formed integrally with the socket 62. The camera housing 61a of the camera body 61 is formed into a substantially spherical shape and has a flat front end surface 61a formed by cutting a part of a sphere and a flat rear end surface 61b located opposite the front end surface 61a and formed by cutting another part of the sphere, in the same manner as in the first and second embodiments. The imaging lens 65 is open in the front end surface 61a. The nut 66 is fixed to the rear end surface 61b, and the cord 67 is drawn through the nut 66 outside the camera housing 61.

The socket 62 is formed into a barrel shape and has a distal end surface 62a and a proximal end surface 62b both of which are open, and an inner periphery formed with a concavely curved surface 62c. Four slits 62d are formed in a peripheral wall of the socket 62 at regular intervals as shown in FIGS. 9 and 10. The peripheral wall of the socket 62 also has a screw hole 62e. The slits 62d are disposed to be symmetrical with respect to the central axis of the socket 62.

The bracket 63 has the distal end surface and the proximal end surface 63a both of which are open and is formed into the shape of a circular truncated cone with a hollow structure. The proximal end opening of the socket 62 is connected to the distal end opening of the bracket 63. The proximal end opening of the bracket 63 is formed with a ring-shaped flange 63b, which has three through holes 63c. The flange 63b also has a cord groove 63d communicating between the inside and the outside of the flange 63b.

The camera housing 61a of the camera body 61 is slidably in close contact with the concavely curved surface 62c of the socket 62 and is fitted into the socket 62 so that the imaging lens 65 is exposed through the proximal end openings 62b and 63a of the socket 62 and the bracket 63, whereby the camera body 61 is mounted on the bracket 63. Since the substantially spherical camera housing 61a fitted into the barrel-shaped socket 62 functions as the ball joint, the optical axis angle of the imaging lens 65 can optionally be adjusted in the up-down direction and the right-left direction.

Figure 11:
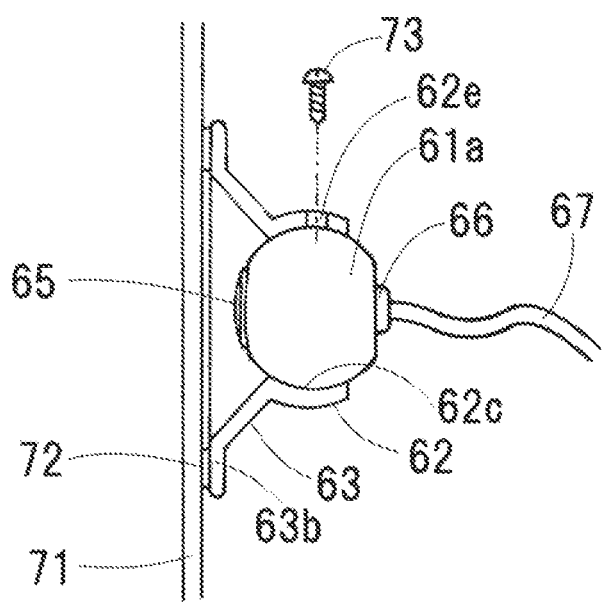
FIG. 11 is a schematic view showing a manner of mounting the camera device onto a window glass.

FIG. 11 exemplifies installation of the camera device 60. When the camera device 60 is mounted on a window glass 71 of a residential building, the double faced adhesive tape 72 is affixed to the underside of the flange 63b. The bracket 63 is fixed to the window glass 71 by the double faced adhesive tape 72. The camera housing 61a is rotated in the socket 62 so that the optical axis angle of the imaging lens 65 is adjusted, and thereafter, the screw 73 is screwed through the screw hole 62e of the socket 62 so that the camera housing 61a is fixed to the socket 62.

Figure 12:
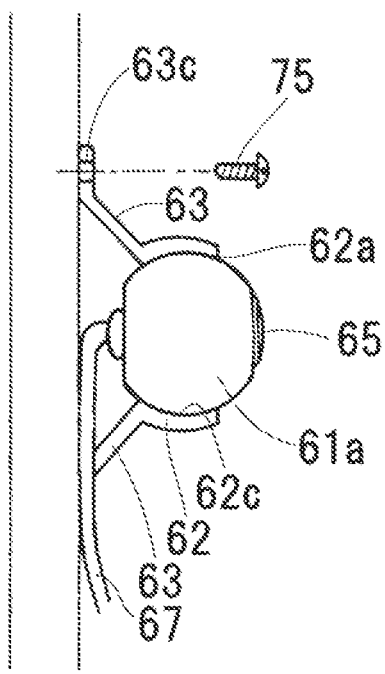
FIG. 12 is a schematic view showing a manner of mounting the camera device onto a wall surface.

When the camera device 60 of the third embodiment is installed on a wall 74 of a residential building, the camera body 60 is fitted into the socket 62 so that the imaging lens 65 of the camera body 60 is exposed through the distal end opening 62a of the socket 62, as shown in FIG. 12. The screw 75 is screwed through the through hole 63c so that the bracket 63 is fixed to the wall 74. The cord 67 is dawn through the cord groove 63d outside the bracket 63.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. A camera device comprising:
   a camera body including a camera housing which is formed into a substantially spherical shape;
   a bracket fixable to a vehicle; and
   a socket provided on the bracket into which a spherical portion of the camera housing is fittable, wherein:
   the camera body includes an imaging lens which is exposed from the socket; and
   the spherical portion of the camera housing is fitted into the socket so that the imaging lens has an optical axis a direction of which is adjustable in a vertical direction and in a right-left direction relative to the socket,
   the socket includes at least a pair of arms both of which have convexly curved surfaces respectively;
   the camera housing is held between the arms so as to be slidably in close contact with the convexly curved surface;
   the imaging lens is fitted between the arms so as to be exposed from between the arm strips, and
   the camera housing includes a portion thereof which is located opposite the imaging lens and to which a nut is fixed so that, when the nut is rotated by an outside force, the camera housing is rotated according to a rotation of the nut.

2. The camera device according to claim 1, wherein the bracket has a bottom formed with an adhesive layer.

3. The camera device according to claim 1, further comprising: a cord that electrically connects the camera body with an external device, wherein the cord is drawn outside through the nut.

4. A camera device comprising:
   a camera body including a camera housing which is formed into a substantially spherical shape;
   a bracket fixable to a vehicle; and
   a socket provided on the bracket into which a spherical portion of the camera housing is fittable, wherein:
   the camera body includes an imaging lens which is exposed from the socket;
   the spherical portion of the camera housing is fitted into the socket so that the imaging lens has an optical axis a direction of which is adjustable in a vertical direction and in a right-left direction relative to the socket;
   the socket has a distal end surface and a proximal end surface both of which have respective openings, the socket further having an inner periphery formed with a convexly curved surface and an outer periphery formed with a plurality of vertical slits, whereby the socket is formed into a barrel shape;
   the bracket has an opening communicating with the proximal end opening of the socket;
   the camera housing is slidably in close contact with the convexly curved surface and fitted into the socket so that the imaging lens is exposed from the distal end opening or the proximal end opening of the socket; and
   the camera housing includes a portion thereof which is located opposite the imaging lens and to which a nut is fixed so that, when the nut is rotated by an outside force, the camera housing is rotated according to a rotation of the nut.

5. The camera device according to claim 4, further comprising: a cord that electrically connects the camera body with an external device, wherein the cord is drawn outside through the nut.

* * * * *